(12) United States Patent
Zeiss

(10) Patent No.: US 12,104,655 B2
(45) Date of Patent: Oct. 1, 2024

(54) TRANSMISSION FOR AN AT LEAST PARTIALLY ELECTRICALLY DRIVEN VEHICLE, AND SYNCHRONIZATION DEVICE FOR SUCH A TRANSMISSION

(71) Applicant: Schaeffler Technologies AG & Co. KG, Herzogenaurach (DE)

(72) Inventor: Tony Zeiss, Nuremberg (DE)

(73) Assignee: Schaeffler Technologies AG &Co. KG, Herzogenaurach (DE)

( * ) Notice: Subject to any disclaimer, the term of this patent is extended or adjusted under 35 U.S.C. 154(b) by 0 days.

(21) Appl. No.: 17/918,585

(22) PCT Filed: Mar. 17, 2021

(86) PCT No.: PCT/DE2021/100265
§ 371 (c)(1),
(2) Date: Oct. 13, 2022

(87) PCT Pub. No.: WO2021/213574
PCT Pub. Date: Oct. 28, 2021

(65) Prior Publication Data
US 2023/0143205 A1    May 11, 2023

(30) Foreign Application Priority Data

Apr. 20, 2020 (DE) ............ 10 2020 110 611.4

(51) Int. Cl.
*F16D 23/04* (2006.01)
*B60K 17/02* (2006.01)
(Continued)

(52) U.S. Cl.
CPC ............ *F16D 23/04* (2013.01); *B60K 17/02* (2013.01); *F16D 23/025* (2013.01);
(Continued)

(58) Field of Classification Search
CPC ......... F16D 23/025–2023/0693; F16D 23/04; F16D 2023/0681; B60K 17/02;
(Continued)

(56) References Cited

U.S. PATENT DOCUMENTS

| 5,696,680 | A | 12/1997 | Ichioka et al. |
| 6,308,794 | B1* | 10/2001 | Oppitz ............... F16D 23/04 |
| | | | 903/952 |
| 2011/0136607 | A1* | 6/2011 | Samie ............... F16H 3/728 |
| | | | 475/2 |

FOREIGN PATENT DOCUMENTS

| DE | 3148338 A1 | 8/1982 |
| DE | 102012109365 A1 | 4/2014 |

(Continued)

*Primary Examiner* — Tinh Dang

(57) ABSTRACT

A transmission for an at least partially electrically driven vehicle includes a rotor shaft of an electric machine, an input shaft, and a synchronization device arranged to couple the input shaft to the rotor shaft. The synchronization device includes a first synchronization ring connected to the rotor shaft for conjoint rotation, a second synchronization ring, a friction disk located axially between the first synchronization ring and the second synchronization ring, a clutch body connected to the input shaft for conjoint rotation, and a sliding sleeve, axially slidable along the clutch body to initiate synchronization of the first synchronization ring and the second synchronization ring for conjoint rotation to couple the rotor shaft to the input shaft. The first synchronization ring may have a cone for receiving the second synchronization ring.

12 Claims, 1 Drawing Sheet

(51) Int. Cl.
   *F16D 1/00*       (2006.01)
   *F16D 23/02*      (2006.01)
   *F16H 57/02*      (2012.01)
   *F16H 63/34*      (2006.01)
   *F16D 23/06*      (2006.01)

(52) U.S. Cl.
   CPC ...... *F16H 63/3425* (2013.01); *F16C 2361/31* (2013.01); *F16C 2361/41* (2013.01); *F16C 2361/43* (2013.01); *F16D 2023/0681* (2013.01); *F16H 2057/02034* (2013.01)

(58) Field of Classification Search
   CPC ......... F16H 63/3425; F16H 2057/0203; B60Y 2200/91; F16C 2361/00–43
   See application file for complete search history.

(56) References Cited

FOREIGN PATENT DOCUMENTS

| | | | |
|---|---|---|---|
| DE | 102012107365 A1 | 5/2014 | |
| DE | 102018105982 A1 | 9/2018 | |
| DE | 112012005127 B4 | 6/2019 | |
| DE | 102020104521 A1 | 6/2021 | |
| WO | 2013082641 A | 6/2013 | |
| WO | WO-2018030344 A1 * | 2/2018 | ............... B60K 1/00 |
| WO | 2019156068 A1 | 8/2019 | |

\* cited by examiner

TRANSMISSION FOR AN AT LEAST PARTIALLY ELECTRICALLY DRIVEN VEHICLE, AND SYNCHRONIZATION DEVICE FOR SUCH A TRANSMISSION

CROSS-REFERENCE TO RELATED APPLICATIONS

This application is the United States National Phase of PCT Appln. No. PCT/DE2021/100265 filed Mar. 17, 2021, which claims priority to German Application No. DE102020110611.4 filed Apr. 20, 2020, the entire disclosures of which are incorporated by reference herein.

TECHNICAL FIELD

The present disclosure relates to a transmission for an at least partially electrically driven vehicle and a synchronization device for such a transmission. Furthermore, the disclosure relates to a vehicle having such a transmission and/or such a synchronization device.

BACKGROUND

During various driving maneuvers or technical processes, pulse-like load changes can occur in the drive train, which cause an overload in the drive train. The pulse-like load changes in the drive train of a motor vehicle can be described both as shocks on the wheel side and as load peaks caused by the drive system. Such interference pulses occur in particular as a result of driving maneuvers, for example through changes in a wheel contact force or through abrupt changes in friction conditions between the wheel and the road surface. Furthermore, interference pulses can occur if a parking lock on the vehicle is activated, resulting in abrupt braking of the vehicle. The resulting torque peaks lead to high loads in the drive train, which can also result in damage.

A torsional vibration damper for a transmission application is known from DE 314 83 38 A1, wherein a clutch part is arranged between a first rotating component and a second rotating component. A friction clutch in the form of a wet clutch is provided between the clutch part and the second rotating component. The clutch part is preloaded by a spring. A hydraulic oil chamber is provided, which changes its volume when the clutch part moves.

SUMMARY

The present disclosure provides a transmission for an at least partially electrically driven vehicle and a synchronization device for such a transmission in such a manner that overloading and damage due to interference pulses to components of the drive train, e.g., an electric machine of the vehicle, is prevented.

A transmission according to the disclosure for an at least partially electrically driven vehicle includes an input shaft which can be coupled to a rotor shaft of an electric machine via a synchronization device, at least one friction disk which is located axially between a first synchronization ring, which is connected to the rotor shaft for conjoint rotation, and a second synchronization ring, a clutch body which is connected to the input shaft for conjoint rotation and a sliding sleeve which is axially slidable along the clutch body. The sliding sleeve is designed to be moved axially in relation to the clutch body by an actuating element in order to initiate synchronization of the synchronization rings and establish a connection to the two synchronization rings for conjoint rotation in order to couple the rotor shaft to the input shaft.

By actuating and axially moving the sliding sleeve in the direction of the first synchronization ring, the second synchronization ring is pressed in the direction of the first synchronization ring so that the respective friction disk between the two synchronization rings comes into frictional contact and consequently causes the rotational speeds of the rotor shaft and the input shaft to be matched. Depending on the requirements, the synchronization device can include one or more friction disks. The respective friction disk is provided, for example, for matching the rotational speeds of the two synchronization rings to one another, so that an axial movement of the sliding sleeve onto the synchronization rings, e.g., onto the first synchronization ring connected to the rotor shaft for conjoint rotation, is made possible for generating the connection for conjoint rotation between the rotor shaft and the input shaft.

The sliding sleeve is arranged radially outside the clutch body and can be axially moved in relation to it. Both the clutch body and the synchronization rings each have an external toothing, and the sliding sleeve has an internal toothing designed to be complementary to the external toothings. The internal toothing of the sliding sleeve is first pushed axially along the clutch body onto the external toothing of the second synchronization ring by actuating the sliding sleeve and prior to synchronization, so that synchronization is initiated. Consequently, at this point there is a form-fitting connection between the clutch body connected to the input shaft for conjoint rotation, the sliding sleeve and the second synchronization ring. After synchronization, i.e., when the rotational speeds of the two synchronization rings are identical, the sliding sleeve is axially moved further until it meshes with the external toothing of the first synchronization ring. At this point, there is a form-fitting connection between the clutch body connected to the input shaft for conjoint rotation, the sliding sleeve, the second synchronization ring and the first synchronization ring connected to the rotor shaft for conjoint rotation. The external toothing on the synchronization rings thus acts as a locking toothing for blocking rotation of the synchronization rings. Furthermore, the respective external toothing of the synchronization rings can be designed to be roof-shaped to prevent abrupt meshing with the internal toothing of the sliding sleeve.

The sliding sleeve can be moved in the axial direction by an actuating element, and the sliding sleeve is arranged in the transmission for conjoint rotation. The actuating element is designed, for example, as an actuating fork or as a screw drive which is drive-connected to the sliding sleeve and can be actuated by an actuator, e.g., an electric motor.

A cone may be formed on the first synchronization ring for receiving the second synchronization ring. In this regard, the second synchronization ring has a friction surface designed to be complementary, and the friction disk is spatially arranged therebetween. The sliding sleeve is first pushed or threaded onto the second synchronization ring by its actuation. As a result, the second synchronization ring is moved or pressed in the direction of the first synchronization ring, and the friction disk arranged between the synchronization rings axially presses against the respective friction surface of the first or second synchronization ring, so that the rotational speed of the second synchronization ring is matched to the rotational speed of the first synchronization ring as a function of the pressure force. Only after the synchronization rings have been synchronized is the rotor shaft coupled to the input shaft, or vice versa, and the sliding sleeve is pushed or threaded onto the first synchronization ring. This ensures that synchronization occurs first and the coupling thereafter. Consequently, the locking or clutch function is finely tuned.

The first synchronization ring may have an internal toothing, which meshes with an external toothing formed on the rotor shaft. Furthermore, the clutch body may have an internal toothing, which meshes with an external toothing formed on the input shaft. The toothings in mesh with one another ensure a secure connection for conjoint rotation between the rotor shaft and the first synchronization ring or between the input shaft and the clutch body. In addition, assembly and maintenance are simplified because the first synchronization ring or the clutch body can be assembled or disassembled in a simple manner.

According to an exemplary embodiment, the input shaft is mounted coaxially to the rotor shaft by means of at least two bearing elements. The input shaft is thus supported at least radially, and, in some embodiments, also axially, relative to a transmission housing of the transmission. In this sense, the two bearing elements may be designed to support the input shaft at least radially relative to a housing of the transmission. The rotor shaft is also supported radially and, if necessary, axially relative to the transmission housing in at least two points by corresponding bearing elements.

According to a further exemplary embodiment, the rotor shaft is designed to be hollow at least in sections at an end facing the input shaft in order to receive the first bearing element for mounting the input shaft. In other words, the input shaft projects partially into the rotor shaft, which is designed to be hollow at least in sections, and is mounted there coaxially to the rotor shaft by a bearing element, which can be designed as a needle bearing to save radial installation space. The advantage of such an arrangement and design of the input shaft and the rotor shaft is that axial installation space of the transmission, in particular, is saved.

A parking lock gear with a toothing may be arranged on the input shaft, and the parking lock gear may be designed such that a pawl for blocking a rotation of the input shaft engages with the toothing. The parking lock gear is part of a parking lock device, which is designed to engage in the toothing of the parking lock gear connected to the input shaft for conjoint rotation with a pawl when actuated by a driver of the vehicle, in order to block the input shaft of the transmission against rotation by this engagement of the pawl and thus prevent the vehicle from rolling away. The toothing of the parking lock gear may be formed on its circumferential surface and thus as an external toothing. The pawl is actuated at least indirectly by an actuator.

Furthermore, at least one additional external toothing can be formed on the input shaft so that an intermediate shaft can mesh at least indirectly with the input shaft. Blocking the rotation of the input shaft by means of the parking lock also prevents the rotation of the intermediate shaft and the components operatively connected to it.

The synchronization device can be actuated, for example, when a request is transmitted by the driver of the vehicle to activate the parking lock device. In this case, after the driver's request has been received, the input shaft is first decoupled from the rotor shaft before the pawl of the parking lock device engages with the toothing of the parking lock gear. This can prevent shocks on the rotor shaft and overloads and/or damage to the electric machine.

A synchronization device according to the disclosure for a transmission for an at least partially electrically driven vehicle is designed to couple an input shaft of the transmission to a rotor shaft of an electric machine. The synchronization device includes at least one friction disk which is located axially between a first synchronization ring and a second synchronization ring, and the first synchronization ring is designed to be connected to the rotor shaft for conjoint rotation. The synchronization device also includes a clutch body, which is designed to be connected to the input shaft for conjoint rotation, and the synchronization device includes a sliding sleeve axially slidable along the clutch body, which can be moved axially in relation to the clutch body by an actuating element and initiates synchronization of the synchronization rings and establishes a connection to the two synchronization rings for conjoint rotation in order to couple the rotor shaft to the input shaft.

The synchronization device is arranged in the power flow between the rotor shaft, which is at least indirectly operatively connected to a rotor of the electric machine, and the input shaft of the transmission and is designed to couple or decouple the rotor shaft and the input shaft to or from one another as a function of the operating state of the vehicle and/or as a function of a driver's request. For example, when a parking lock device is activated, the synchronization device is used to decouple the rotor shaft from the input shaft to protect the electric machine from damage due to torque peaks, interference pulses and shocks in the drive train.

A vehicle according to the disclosure has several axles, and at least one axle is designed to be drivable. The drive is at least partially electric, and the drive can further be supported by an internal combustion engine. The respective driven axle is connected to a drive train of the vehicle, which has the transmission according to the disclosure. For example, the vehicle has a synchronization device according to the disclosure.

BRIEF DESCRIPTION OF THE DRAWINGS

The disclosure is described in more detail below together with the description of two exemplary embodiments with reference to the figures. In the figures.

DETAILED DESCRIPTION

FIGS. 1 to 4 show a transmission 1 for an at least partially electrically driven vehicle, not shown here, in various embodiments in part. The transmission 1 includes a rotor shaft 4, which is operatively connected to a rotor of an electric machine, not shown here. Furthermore, the transmission 1 includes an input shaft 2, which transmits a torque and a rotational speed to an intermediate shaft, also not shown here, via an external toothing 17.

Figure 1:
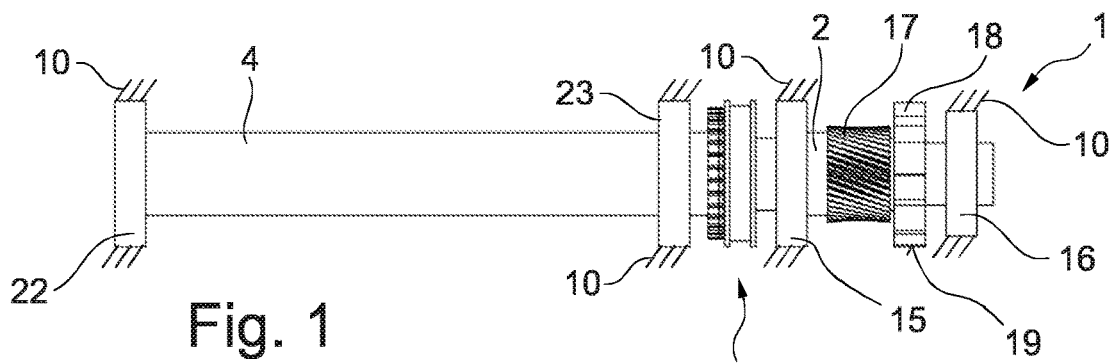
FIG. 1 shows a schematic view of a transmission with a synchronization device according to a first embodiment.
Figure 2:
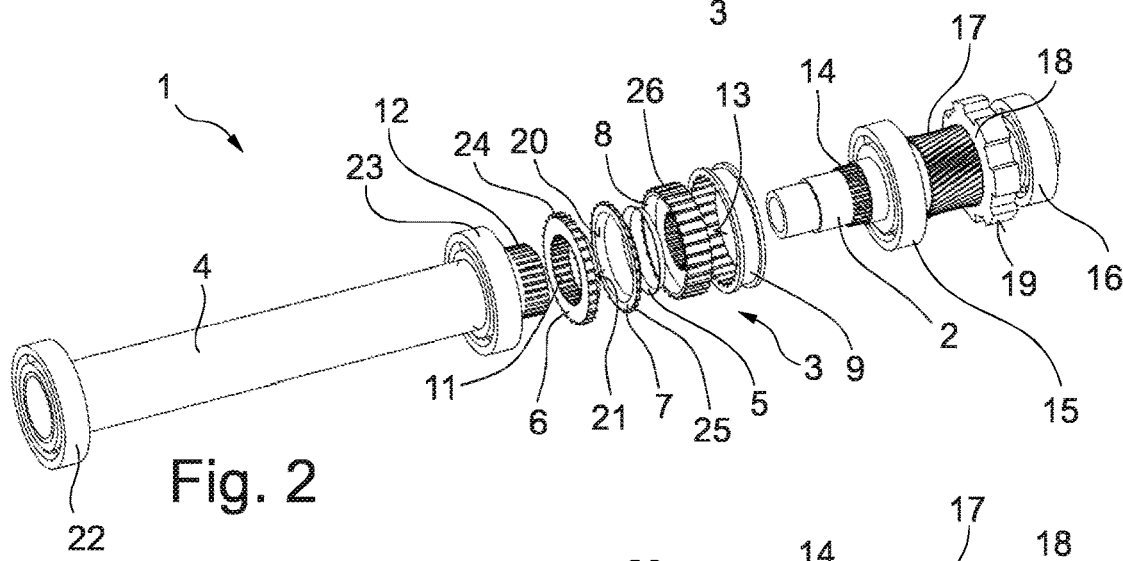
FIG. 2 shows a schematic exploded view of the transmission according to FIG. 1.

The rotor shaft 4 is rotatably mounted on a housing 10 of the transmission 1 via two bearing elements 22, 23. The input shaft 2 is also mounted coaxially to the rotor shaft 4 in relation to the housing 10 via two bearing elements 15, 16. According to a first embodiment as shown in FIGS. 1 and 2, both bearing elements 15, 16 are designed to support the input shaft 2 at least radially relative to the housing 10 of the transmission 1.

Figure 3:
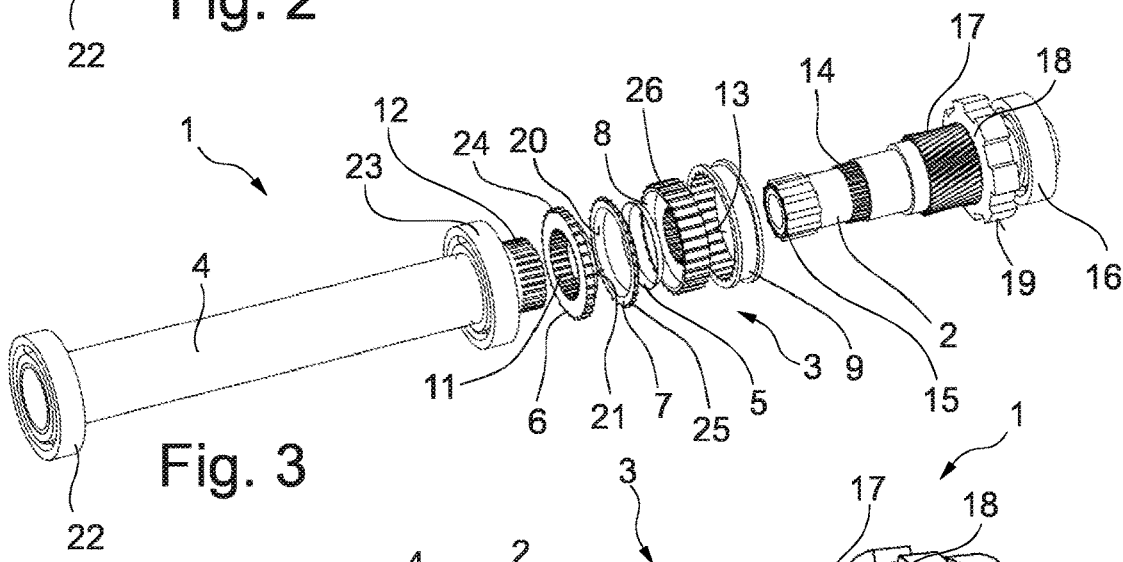
FIG. 3 shows a schematic exploded view of the transmission with the synchronization device according to a second embodiment.
Figure 4:
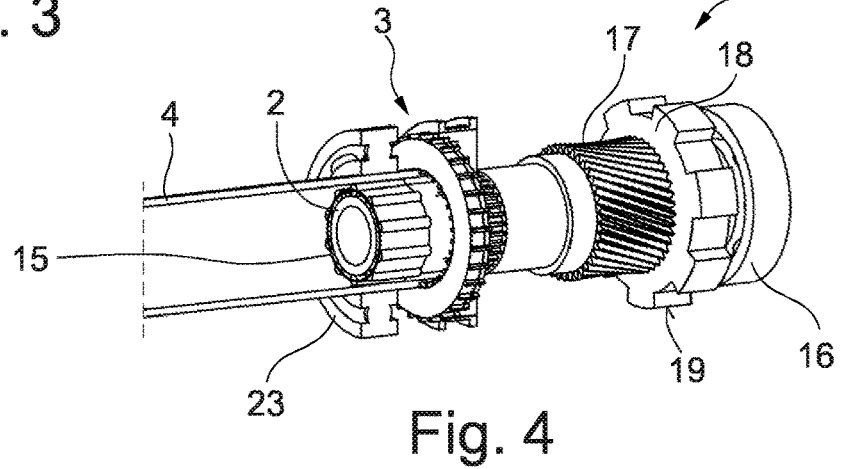
FIG. 4 shows a perspective sectional view of the transmission according to FIG. 3.

According to an alternative embodiment as shown in FIGS. 3 and 4, the rotor shaft 4 is designed to be hollow, and the input shaft 2 partially projects coaxially into the rotor shaft 4 and is supported on the rotor shaft 4 via the first bearing element 15, which is designed as a needle bearing to save radial installation space in the present case. Consequently, the rotor shaft 4 is designed to receive the first bearing element 15 for mounting the input shaft 2. The partial integration of the input shaft 2 into the interior of the rotor shaft 4 saves axial installation space of the transmission 1.

The input shaft 2 and the rotor shaft 4 can be coupled to one another via a synchronization device 3. The synchronization device 3 is configured in such a manner that, after synchronization of the rotational speeds of the input shaft 2 and the rotor shaft 4, a coupling occurs in order to transmit a torque as well as a rotational speed.

The synchronization device 3 includes a friction disk 5 which is located axially between a first synchronization ring 6 connected to the rotor shaft 4 for conjoint rotation and a second synchronization ring 7. The first synchronization ring 6 has an internal toothing 11 that meshes with an external toothing 12 formed on the rotor shaft 4. Furthermore, the synchronization device 3 has a clutch body 8 connected to the input shaft 2 for conjoint rotation, on the outer circumference of which is located a sliding sleeve 9 in an axially movable manner. The connection for conjoint rotation of the clutch body 8 to the input shaft 2 is achieved by the clutch body 8 having an internal toothing 13, which meshes with an external toothing 14 formed on the input shaft 2.

The sliding sleeve 9 has an internal toothing 13, which is designed to be complementary to an external toothing 24, 25, 26 of the two synchronization rings 6, 7 and of the clutch body 8, so that a connection for conjoint rotation is provided or can be established between the components 6, 7, 8, as explained below.

In a decoupled state of the transmission 1, the sliding sleeve 9 with its internal toothing 13 exclusively meshes with the external toothing 26 of the clutch body 8, and the sliding sleeve 9 is axially movable in relation to the clutch body 8 by an actuating element, not shown here. The actuating element is designed, for example, as a shift fork, which is actuated by an actuator as a result of a driver's request to couple the rotor shaft 4 to the input shaft 2 and as a result axially moves the sliding sleeve 9 in the direction of the synchronization rings 6, 7.

By moving the sliding sleeve 9 in the direction of the synchronization rings 6, 7, synchronization of the synchronization rings 6, 7 is initiated, whereby a first rotational speed of the first synchronization ring 6, which is connected to the rotor shaft 4 for conjoint rotation, can be matched or is matched to a second rotational speed of the second synchronization ring 7, which is connected to the input shaft 2 for conjoint rotation, until the first and second rotational speeds are substantially equal.

The synchronization of the rotational speeds is achieved by the sliding sleeve 9 first meshing with the external toothing 25 of the second synchronization ring 7 as a result of its axial movement. Subsequently, the second synchronization ring 7 is pressed in the direction of the first synchronization ring 6 by the axially moving sliding sleeve 9, wherein the friction disk 5, which is designed here as a conical friction ring, comes into frictional contact with the two synchronization rings 6, 7. The acting frictional forces match the rotational speeds of the synchronization rings 6, 7 so that the sliding sleeve 9 can then mesh with the external toothing 24 of the first synchronization ring 6 in order to couple the rotor shaft 4 to the input shaft 2. In other words, synchronization of the rotational speeds occurs first, and a coupling of the rotor shaft 4 to the input shaft 2 occurs after synchronization. A decoupling of the rotor shaft 4 from the input shaft 2, or vice versa, is done in reverse order. The axial movement of the sliding sleeve 9 for coupling or decoupling the rotor shaft 4 with/from the input shaft 2 occurs in a continuous movement, and the components of the synchronization device 3 are designed and dimensioned accordingly.

To improve the friction properties, e.g., to increase the friction surface, the first synchronization ring 6 has a cone 21, which is designed to receive the second synchronization ring 7. For this purpose, the second synchronization ring 7 has a friction surface 20 designed to be complementary to the cone 21, wherein the friction disk 5 is also designed correspondingly.

The decoupling of the rotor shaft 4 from the input shaft 2 is beneficial if, as is the case here, a parking lock gear 18 of a parking lock device, not shown further here, is arranged on the input shaft 2 for conjoint rotation. As a result of a driver's request to activate the parking lock, a pawl, not shown here, is actuated which, as a result of the activation of the parking lock device, engages in a toothing 19 of the parking lock gear 18 designed as an external toothing, thereby blocking a rotation of the input shaft 2. To prevent the resulting torque peaks caused by interference pulses, the synchronization device decouples the rotor shaft 4 from the input shaft 2 in the manner described above so that damage to the electric machine is prevented.

The parking lock device can include a separate actuator by means of which the pawl is at least indirectly actuated. Alternatively, the transmission 1 can be designed in such a manner that both the pawl and the sliding sleeve 9 are actuated by the same actuator. Thus, by decoupling the rotor shaft 4 from the input shaft 2, in the event that the parking lock is activated, it is possible to activate the parking lock even if the vehicle is still rolling or being driven at a very low speed without damaging the electric machine.

REFERENCE NUMERALS

1 Transmission
2 Input shaft
3 Synchronization device
4 Rotor shaft
5 Friction disk
6 First synchronization ring
7 Second synchronization ring
8 Clutch body
9 Sliding sleeve
10 Housing of the transmission
11 Internal toothing of the first synchronization ring
12 External toothing of the rotor shaft
13 Internal toothing of the clutch body
14 First external toothing of the input shaft
15 First bearing element
16 Second bearing element
17 Second external toothing of the input shaft
18 Parking lock gear
19 Toothing of the parking lock gear
20 Friction surface of the second synchronization ring
21 Cone
22 Third bearing element
23 Fourth bearing element
24 Locking toothing of the first synchronization ring
25 Locking toothing of the second synchronization ring
26 Locking toothing of the clutch body

The invention claimed is:

1. A transmission for an at least partially electrically driven vehicle, comprising an input shaft which can be coupled to a rotor shaft of an electric machine via a synchronization device; at least one friction disk which is located axially between a first synchronization ring, which is connected to the rotor shaft for conjoint rotation, and a second synchronization ring; a clutch body which is connected to the input shaft for conjoint rotation; and a sliding sleeve which is axially slidable along the clutch body, wherein:
the sliding sleeve is designed to be moved axially in relation to the clutch body by an actuating element in order to initiate synchronization of the two synchronization rings and establish a connection to the two synchronization rings for conjoint rotation in order to couple the rotor shaft to the input shaft;
the input shaft is mounted coaxially to the rotor shaft by means of a first bearing element;
the rotor shaft is supported radially relative to a housing of the transmission by means of a second bearing element;
the rotor shaft is designed to be hollow at least in sections at an end facing the input shaft in order to receive the first bearing element for mounting the input shaft; and
the first bearing element is disposed at least partially radially inside of and axially overlapping the second bearing element.

2. The transmission according to claim 1, wherein a cone for receiving the second synchronization ring is formed on the first synchronization ring.

3. The transmission according to claim 1, wherein the first synchronization ring has an internal toothing, which meshes with an external toothing formed on the rotor shaft.

4. The transmission according to claim 1, wherein the clutch body has an internal toothing, which meshes with an external toothing formed on the input shaft.

5. The transmission according to claim 1, wherein a parking lock gear with a toothing is arranged on the input shaft, wherein the input shaft can be decoupled from the rotor shaft of the electric machine via the synchronization device and the parking lock gear is designed such that a pawl for blocking a rotation of the input shaft engages with the toothing.

6. A synchronization device for a transmission for an at least partially electrically driven vehicle, which is designed to couple an input shaft of the transmission to a rotor shaft of an electric machine, comprising at least one friction disk which is located axially between a first synchronization ring and a second synchronization ring, wherein the first synchronization ring is designed to be connected to the rotor shaft for conjoint rotation, the synchronization device further comprising a clutch body, which is designed to be connected to the input shaft for conjoint rotation, and a sliding sleeve axially slidable along the clutch body, which can be moved axially in relation to the clutch body by an actuating element and initiates synchronization of the two synchronization rings and establishes a connection to the two synchronization rings for conjoint rotation in order to couple the rotor shaft to the input shaft, wherein:
the input shaft is mounted coaxially to the rotor shaft by means of a first bearing element;
the rotor shaft is supported radially relative to a housing of the transmission by means of a second bearing element;
the rotor shaft is designed to be hollow at least in sections at an end facing the input shaft in order to receive the first bearing element for mounting the input shaft; and
the first bearing element is disposed at least partially radially inside of and axially overlapping the second bearing element.

7. A vehicle comprising a synchronization device according to claim 6.

8. A transmission for an at least partially electrically driven vehicle, comprising:
housing;
a rotor shaft of an electric machine;
an input shaft; and
a synchronization device arranged to couple the input shaft to the rotor shaft, the synchronization device comprising:
a first synchronization ring connected to the rotor shaft for conjoint rotation;
a second synchronization ring;
a friction disk located axially between the first synchronization ring and the second synchronization ring;
a clutch body connected to the input shaft for conjoint rotation;
a sliding sleeve, axially slidable along the clutch body to initiate synchronization of the first synchronization ring and the second synchronization ring for conjoint rotation to couple the rotor shaft to the input shaft;
a first bearing element for mounting the input shaft coaxially to the rotor shaft; and
a second bearing element for supporting the rotor shaft radially relative to the housing; wherein:
the rotor shaft comprises a hollow end facing the input shaft;
the first bearing element is disposed in the hollow end; and
the first bearing element is disposed at least partially radially inside of and axially overlapping the second bearing element.

9. The transmission of claim 8, wherein the first synchronization ring comprises a cone for receiving the second synchronization ring.

10. The transmission of claim 8, wherein:
the rotor shaft comprises an external toothing; and
the first synchronization ring comprises an internal toothing meshed with the external toothing.

11. The transmission of claim 8, wherein:
the input shaft comprises an external toothing; and
the clutch body comprises an internal toothing meshed with the external toothing.

12. The transmission of claim 8 further comprising a parking lock gear arranged on the input shaft, wherein:
the input shaft can be decoupled from the rotor shaft of the electric machine via the synchronization device;
the parking lock gear comprises a toothing; and
the toothing is arranged to engage a pawl for blocking a rotation of the input shaft.

* * * * *